US008158222B2

(12) United States Patent
Kaimoto et al.

(10) Patent No.: US 8,158,222 B2
(45) Date of Patent: Apr. 17, 2012

(54) METHOD FOR MANUFACTURING INKJET RECORDING MEDIUM

(75) Inventors: Hideki Kaimoto, Shizuoka-ken (JP); Ryoichi Nakano, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 488 days.

(21) Appl. No.: 12/414,353

(22) Filed: Mar. 30, 2009

(65) Prior Publication Data

US 2009/0246386 A1 Oct. 1, 2009

(30) Foreign Application Priority Data

Mar. 31, 2008 (JP) ................................ 2008-090997

(51) Int. Cl.
*B32B 15/02* (2006.01)

(52) U.S. Cl. ...................... 428/32.34; 428/402; 428/323

(58) Field of Classification Search ........................ None
See application file for complete search history.

(56) References Cited

U.S. PATENT DOCUMENTS

2007/0171267 A1 7/2007 Tojo et al.
2007/0196597 A1 * 8/2007 Shiratsuchi et al. ....... 428/32.34

FOREIGN PATENT DOCUMENTS

JP 2004-358774 A 12/2004
JP 2005-199671 A 7/2005
JP 2005-271441 A 10/2005
JP 2007-196396 A 8/2007

* cited by examiner

*Primary Examiner* — Necholus Ogden, Jr.
(74) *Attorney, Agent, or Firm* — Sughrue Mion, PLLC

(57) ABSTRACT

There is provided a method for manufacturing an inkjet recording medium, the method including forming an undercoat layer by coating an undercoat layer-forming liquid containing a binder resin and a water-soluble divalent metal salt, on a support; forming a coating film by coating a coating film-forming liquid containing at least inorganic fine particles and an acetoacetyl-modified polyvinyl alcohol, on the undercoat layer; and applying a curing solution containing a water-soluble multifunctional compound having two or more amino groups in the molecule, onto the coating film, either simultaneously with the forming of the coating film, or before the coating film undergoes decreasing-rate drying during drying of the coating film.

6 Claims, No Drawings

METHOD FOR MANUFACTURING INKJET RECORDING MEDIUM

CROSS-REFERENCE TO RELATED APPLICATION

This application is based on and claims priority under 35 USC 119 from Japanese Patent Application No. 2008-090997 filed on Mar. 31, 2008, the disclosures of which is incorporated herein by reference in its entirety.

BACKGROUND OF THE INVENTION

1. Field of the Invention

The present invention relates to a method for manufacturing an inkjet recording medium which has an ink receiving layer for receiving ink.

2. Description of the Related Art

In regard to inkjet recording methods, inkjet recording media in which the recording layer for receiving ink is constituted of a porous structure for the purpose of improving general properties, have been proposed and put into practical use. For example, there is available an inkjet recording medium in which a recording layer containing inorganic pigment particles and a water-soluble binder, and having high porosity has been provided on a support. Since such an inkjet recording medium has a porous structure, the inkjet recording medium has excellent ink receptivity (quick dryability) and high glossiness, and thus is widely used as a material capable of recording photograph-like images.

A recording layer having high porosity, which is formed by using inorganic pigment particles and a water-soluble binder, generally has particles of small size and a high content of particles. Therefore, after applying a coating liquid to form a film, cracks may be generated in the formed film during drying the film. These cracks are prone to occur, particularly in the case of, for example, drying at a relatively high temperature so as to shorten the drying time, and the cracks are likely to occur during drying after the coating, specifically during the period of transition from constant-rate drying to decreasing-rate drying.

As a method of preventing cracks, a method of increasing the viscosity of the binder in the coating liquid has been known. However, viscosity increase is not desirable from the viewpoint of, for example, unevenness in the coating. In another method, cracks that occur during drying after coating can be prevented by using a binder such as acetoacetyl-modified polyvinyl alcohol in combination with a crosslinking agent.

Meanwhile, from the viewpoint of recording photograph-like images, it is important that bleeding of ink (i.e., the image) does not occur after recording, and as a method of preventing the bleeding of ink, there are known methods of incorporating a cationic polymer, a polyvalent metal compound or the like into the recording layer on which the ink is to be deposited, or of using water-soluble cellulose derivatives.

In relation to the cracks or ink bleeding described above, a recording material for inkjet printing provided with an ink receiving layer which includes a two-layered coating layer formed by simultaneously applying an ink receiving layer which contains a resin binder having a keto group, and an ink receiving layer which contains a crosslinking agent, to be adjacent to each other (see, for example, Japanese Patent Application Laid-Open (JP-A) No. 2005-199671), or an inkjet recording sheet formed by sequentially laminating an undercoat layer containing a binding agent, a crosslinking agent and a water-soluble cellulose derivative as main components, and an ink-accepting layer containing inorganic fine particles and an acetoacetyl-modified polyvinyl alcohol as main components (see, for example, JP-A No. 2005-271441), have been disclosed. It is suggested that the former is free from cracks and has excellent water resistance, while the latter has high film strength.

There is also disclosed a method for manufacturing an inkjet recording medium, the method including applying a colorant receiving layer coating liquid containing a dispersion of inorganic fine particles dispersed in an aqueous medium containing a film-hardening agent and a dispersant. The colorant receiving layer coating liquid also contains hydroxypropyl cellulose and/or a cationic urethane resin (see, for example, JP-A No. 2004-358774). It is suggested that, according to this method, favorable dispersibility of the inorganic fine particles is achieved, and bleeding with a lapse of time does not occur.

Furthermore, a recording method of using an inkjet recording medium has also been disclosed (see, for example, JP-A No. 2007-196396). The inkjet recording medium is produced by incorporating a water-soluble metal salt into an ink receiving layer in order to enhance the ozone resistance of images in the case where a dye, particularly a phthalocyanine-based dye, is used as a colorant.

SUMMARY OF THE INVENTION

However, although attempts have been made to alleviate the brittleness of cracks or the like, and to suppress the ozone resistance of, for example, an ink (image) containing a dye, by forming an ink receiving layer using an acetoacetyl-modified polyvinyl alcohol, a crosslinking agent therefor and a water-soluble metal salt, there have actually been problems in that the stability of the coating liquid for forming a layer for receiving ink is markedly deteriorated, and the images obtained after printing has decreased moisture resistance.

The present invention was achieved under such circumstances as described above, and provides a method for manufacturing an inkjet recording medium, which method prevents the occurrence of film defects such as cracks by improving the brittleness after coating (particularly, during drying) while maintaining the stability of the coating liquid, and may suppress ink bleeding after recording and enhance moisture resistance and ozone resistance.

Specifically, according to one aspect of the invention, there is provided a method for manufacturing an inkjet recording medium, the method including:

forming an undercoat layer by applying an undercoat layer-forming liquid containing binder resin and a water-soluble divalent metal salt on a support;

forming a coating film by coating a coating film-forming liquid containing at least inorganic fine particles and an acetoacetyl-modified polyvinyl alcohol, on the undercoat layer; and applying a curing solution containing a water-soluble multifunctional compound having two or more amino groups in the molecule, onto the coating film, either simultaneously with the forming of the coating film, or before the coating film undergoes decreasing-rate drying during drying of the coating film.

According to an exemplary embodiment of the invention, there can be provided a method for manufacturing an inkjet recording medium, which method prevents the occurrence of film defects such as cracks by improving the brittleness after coating (particularly, during drying) while maintaining the stability of the coating liquid, and may suppress ink bleeding after recording, enhancing moisture resistance and ozone resistance.

DETAILED DESCRIPTION OF THE INVENTION

Hereinafter, the method for manufacturing an inkjet recording medium of the present invention will be described in detail.

The method for manufacturing an inkjet recording medium of the invention includes forming an undercoat layer by applying an undercoat layer-forming liquid containing a binder resin and a water-soluble divalent metal salt on a support; forming a coating film by applying a coating film-forming liquid containing at least inorganic fine particles and an acetoacetyl-modified polyvinyl alcohol on the undercoat layer; and applying a curing solution containing a water-soluble multifunctional compound having two or more amino groups in the molecule, onto the coating film, either simultaneously with the forming of the coating film, or before the coating film undergoes decreasing-rate drying during drying of the coating film.

According to the invention, when an ink receiving layer is formed using a film-forming liquid containing an acetoacetyl-modified polyvinyl alcohol (hereinafter, sometimes referred to as "acetoacetyl-modified PVA"), which has a crack suppressing effect during drying of the coating film, a water-soluble divalent metal salt such as magnesium chloride, which is effective in improving the ozone resistance of image is contained in the undercoat layer. As a result, it is particularly possible to effectively suppress the viscosity increase that otherwise occurs to a great extent when an acetoacetyl-modified PVA and a water-soluble metal salt are used in combination, and the resultant deterioration of the coating property. Thus, the coating liquid stability in such a composition system is maintained, occurrence of film defects such as cracks may be prevented by improving the brittleness after coating (particularly, during drying), and at the same time, moisture resistance or ozone resistance of the image obtained after recording may also be enhanced.

Furthermore, in the aforementioned constitution, it is a more preferred exemplary embodiment to form the ink receiving layer such that the acetoacetyl-modified PVA and its crosslinking agent, i.e., the "water-soluble multifunctional compound having two or more amino groups in the molecule," are not brought into direct contact. Description will be detailed below in this regard.

Hereinafter, the respective processes according to the invention will be described in detail.

<Process for Forming Undercoat Layer>

The present process is a process for forming an undercoat layer by applying an undercoat layer-forming liquid containing a binder resin and a water-soluble divalent metal salt on a support.

(Undercoat Layer-Forming Liquid)

—Binder Resin—

The undercoat layer-forming liquid for use in the formation of an undercoat layer contains a binder resin and a water-soluble divalent metal salt. As the binder resin, a hydrophilic polymer is preferred considering that later-described aqueous solvents are used as the solvent. Examples of the hydrophilic polymer include polyvinyl alcohol, various modified polyvinyl alcohols, casein, gelatin, and polyvinylpyrrolidone. Among these, gelatin and polyvinyl alcohol are preferably used, and gelatin having a viscosity according to the PAGI method of 10 to 30 mP and a jelly strength according to the PAGI method of 15 to 70 g, is particularly preferred. When such a binder resin is used, adhesiveness and moisture resistance of the ink receiving layer are further enhanced.

—Water-Soluble Divalent Metal Salt—

Examples of the water-soluble divalent metal salt include water-soluble magnesium salts, water-soluble calcium salts, water-soluble barium salts, water-soluble zinc salts, and water-soluble strontium salts. Among them, from the viewpoints of ozone resistance, moisture resistance and water resistance, water-soluble magnesium salts or water-soluble calcium salts are preferred.

Here, the term "water-soluble" means that when a saturated aqueous solution of the metal salt is prepared with water at 20° C., the amount of the metal salt contained in 100 g of the saturated solution is 1 g or more. The same applies throughout the application.

The water-soluble magnesium salt is not particularly limited, and known salts may be selected. Example of the magnesium salt include magnesium chloride, magnesium sulfate, magnesium nitrate, magnesium phosphate, magnesium chlorate, magnesium acetate, magnesium oxalate, and magnesium hydroxide. Among them, magnesium chloride, magnesium sulfate or magnesium nitrate is preferred, with magnesium chloride being particularly preferred.

Example of the water-soluble calcium salt include calcium chloride, calcium nitrate, calcium sulfate, calcium hydroxide, calcium citrate, calcium phosphate, calcium acetate, and calcium oxalate. Among them, calcium chloride or calcium nitrate is preferred, with calcium chloride being particularly preferred.

The water-soluble metal salt may be used alone, or in combination of two or more species thereof.

It is desirable that the content of the water-soluble divalent metal salt in the undercoat layer liquid is set such that the content in the undercoat layer after the coating process is in the range of 0.01 to 1 g/$m^2$, and suitably in the range of 0.02 to 0.5 g/$m^2$. By setting the content of the water-soluble divalent metal salt in the layer to be in the aforementioned range, bleeding resistance may be secured, while maintaining ozone resistance of the recorded image.

Furthermore, in this case, the mass ratio of the water-soluble divalent metal salt to the binder resin in the layer (metal salt/resin) is desirably set to be in the range of 1/20 to 5/5, and more desirably in the range of 1/10 to 4/5.

For the undercoat layer-forming liquid, water, an organic solvent or a mixed solvent thereof may be used as the solvent. As the organic solvent which may be used in the coating, there may be mentioned alcohols such as methanol, ethanol, n-propanol, i-propanol or methoxypropanol; ketones such as acetone or methyl ethyl ketone; tetrahydrofuran, acetonitrile, ethyl acetate, toluene or the like. In this regard, the same applies to the case of preparing a film-forming liquid that will be described later.

The concentration of solids in the undercoat layer-forming liquid is desirably in the range of 0.1 to 20% by mass, and more suitably in the range of 0.5 to 10% by mass.

Coating of the undercoat layer-forming liquid may be carried out by using a known coating method. Examples of the known coating method include methods of using an extrusion die coater, an air doctor coater, a blade coater, a rod coater, a knife coater, a squeeze coater, a reverse roll coater, and a bar coater.

The amount of coating of the undercoat layer-forming liquid is desirably in the range of 1 to 15 ml/$m^2$.

Drying of the undercoat layer-forming liquid after coating is desirably carried out at 20 to 100° C. for 10 seconds to 5 minutes (particularly, 20 seconds to 3 minutes). This drying time naturally varies with the amount of coating, but the above-described range is adequate.

The thickness of the undercoat layer is preferably in the range of 0.05 to 5 μm, and more preferably in the range of 0.05 to 2 μm, from the viewpoint of the enhancement of ozone resistance, brittleness, and the adhesiveness to the image-receiving layer.

(Support)

As the support that is used in the invention, for example, any of a transparent support formed of a transparent material such as plastics and an opaque support constituted of an opaque material such as paper may be utilized. Among them, a resin-coated paper having resin layers respectively provided on both sides of a substrate such as paper is suitable.

According to the invention, polyolefin resin-coated paper is particularly preferred as the resin-coated paper.

The base paper of the polyolefin resin-coated paper is not particularly limited, and any paper that is generally used may be used, but is more preferably, for example, a smooth base paper such as that used as a photographic support is preferred. As the pulp constituting the base paper, natural pulp, recycled pulp, synthetic pulp and the like may be used individually alone or as a mixture of two or more species.

In the base paper, additives that are generally used in paper manufacturing, such as a sizing agent, a paper strength enhancing agent, a filling material, an antistatic agent, a fluorescent brightener and a dye, may be incorporated. Furthermore, a surface sizing agent, a surface strengthening agent, a fluorescent brightener, an antistatic agent, a dye, an anchoring agent or the like may also be coated on the surface.

The thickness of the base paper is not particularly limited, but a paper having good surface smoothness that is obtained by, for example, compressing paper by applying pressure with a calendar or the like, during the paper-making process or after the paper-making process is preferred. The basis weight is preferably in the range of 30 to 250 $g/m^2$, and particularly preferably in the range of 50 to 250 $g/m^2$.

Examples of the polyolefin resin of the polyolefin resin-coated paper include homopolymers of olefin, such as low density polyethylene, high density polyethylene, polypropylene, polybutene, or polypentene; copolymers formed from two or more olefins, such as ethylene-propylene copolymer; and mixtures thereof. For the polyolefin resins, resins having various densities and melt viscosity indices (melt indices) may be used alone or as mixtures of two or more species thereof.

In the polyolefin resin of the polyolefin resin-coated paper, it is preferable to add at least one of various additives, including white pigments such as titanium oxide, zinc oxide, talc, or calcium carbonate; fatty acid amides such as stearic acid amide, or arachidic acid amide; fatty acid metal salts such as zinc stearate, calcium stearate, aluminum stearate, or magnesium stearate; antioxidants such as IRGANOX 1010, or IRGANOX 1076; blue pigments or dyes such as cobalt blue, ultramarine blue, cecilian blue, or phthalocyanine blue; magenta pigments or dyes such as cobalt violet, fast violet, or manganese purple; fluorescent brighteners, ultraviolet absorbents and the like, optionally in combination.

The polyolefin resin-coated paper may be produced by a so-called extrusion coating method in which a molten polyolefin resin obtained by heating is flow cast on a running base paper, whereby one surface or both surfaces of the base paper are coated with the polyolefin resin. Before coating the base paper with the polyolefin resin, it is preferable to apply an activation treatment such as a corona discharging treatment or a flame treatment to the surfaces of the base paper.

The resin-coated paper is preferably constituted such that a polyolefin resin is coated on the surface where an ink receiving layer is applied and formed (this is designated as the front surface), but the rear surface on the opposite side is not necessarily required to be coated with a polyolefin resin. However, from the viewpoint of preventing curling, it is preferable that the rear surface is also coated with a polyolefin resin. In this case, an activation treatment such as a corona discharge treatment or a flame treatment may be applied to the front surface, or if necessary, to both the front and rear surfaces.

In the case of coating a polyolefin resin, the thickness is preferably in the range of 5 to 50 μm, and particularly preferably in the range of 10 to 45 μm.

The polyolefin resin-coated paper may be provided with various backcoat layers for the purpose of imparting antistatic properties, conveyability, curl preventability and the like. The backcoat layers may contain at least one of inorganic antistatic agents, organic antistatic agents, hydrophilic binders, latexes, curing agents, pigments, surfactants, or the like optionally in combination. It is also acceptable to provide an ink receiving layer on both sides of the polyolefin resin-coated paper.

<Process for Forming Coating Film>

In the process for forming a coating film, a coating film-forming liquid containing at least inorganic fine particles and an acetoacetyl-modified polyvinyl alcohol is applied, on the undercoat layer formed on the support, to form a coating film. This coating film serves as the ink receiving layer when the recording medium is used in inkjet recording, and the coating film-forming liquid may also be referred to as "ink receiving layer-coating liquid."

In the present process, the formation of a coating film may be carried out by using a single coating film-forming liquid, or may be carried out by using dual coating film-forming liquids (a first solution and a second solution), but as will be described later, it is preferable to conduct the formation by using two coating film=forming liquids, from the viewpoints of obtaining coating liquid stability and avoiding the occurrence of coating defects during the drying of the coating.

Hereinafter, the respective cases will be described.

A. Case where Coating Film Formation is Carried Out with a Single Coating Film-Forming Liquid The single coating film-forming liquid used in this case contains at least inorganic fine particles and an acetoacetyl-modified polyvinyl alcohol.

(Coating Film-Forming Liquid)

—Inorganic Fine Particles—

The inorganic fine particles are preferably selected from particles having an average secondary particle size of 500 nm or less. For example, various known fine particles such as particles of amorphous synthetic silica, alumina, alumina hydrate, calcium carbonate, magnesium carbonate, or titanium dioxide can be used. In particular, particles of amorphous synthetic silica, alumina, or alumina hydrate are preferred.

The amorphous synthetic silica can be roughly classified into wet process silica, gas phase process silica and others according to the production method. The wet process silica is further classified into precipitation process silica, gel process silica, and sol process silica according to the production method.

In the case of the precipitation process silica, silica particles which have been produced by reacting sodium silicate with sulfuric acid under alkaline conditions and have undergone particle growth, are subjected to aggregation/precipitation, and then are subjected to processes of filtration, water washing, drying and pulverization/classification, to provide final products. The precipitation process silica is commercially available under the trade names of, for example, NIPSIL from Tosoh Silica Corporation, and TOKUSIL from Tokuyama Corporation.

The gel process silica is produced by reacting sodium silicate with sulfuric acid under acidic conditions. Since fine particles dissolve and reprecipitate so as to bind other primary particles with each other during aging, definite primary particles are lost, and relatively hard aggregated particles having an internal void structure are formed. Gel process silica is commercially available under the trade names of, for example, NIPGEL from Tosoh Silica Corporation, and SYLOID and SYLOJET from Grace Japan Co., Ltd. The sol process silica is also known as colloidal silica, and is obtained by heating and aging a silica sol, which is obtainable by double decomposition of sodium silicate with acid or the like, or by passing sodium silicate through an ion-exchange resin layer. The sol process silica is commercially available under the trade name of, for example, SNOWTEX from Nissan Chemical Industries, Ltd.

The gas phase process silica is also known as dry process silica in contrast to the wet process silica, and is generally produced according to a flame hydrolysis method. Specifically, a method of combusting silicon tetrachloride together with hydrogen and oxygen, is generally known, but a silane such as methyltrichlorosilane or trichlorosilane may also be used in place of silicon tetrachloride, either alone or as a mixture with silicon tetrachloride. The gas phase process silica is commercially available under the trade names of AEROSIL from Nippon Aerosil Co., Ltd., and QS TYPE from Tokuyama Corporation.

The gas phase process silica is suitably used by dispersing the gas phase process silica in the presence of a cationic compound, to obtain an average secondary particle size of 500 nm or less, preferably 10 to 300 nm, and more preferably 20 to 200 nm. As for the dispersion method, it is preferable that the gas phase process silica and a dispersion medium are preliminarily mixed by conventional propeller stirring, turbine type stirring, homomixer type stirring or the like, and then dispersion is performed by an apparatus such as a media mill such as a ball mill, a bead mill or a sand grinder; a pressure type dispersing machine such as high pressure homogenizer or a ultrahigh pressure homogenizer; an ultrasonic dispersing machine, a thin film revolving type dispersing machine, or the like. Here, the term average secondary particle size is an average value of the particle size of the aggregated particles dispersed in the obtained ink receiving layer, which are measured by observation of the ink receiving layer with an electron microscope.

Furthermore, a wet process silica pulverized to an average secondary particle size of 500 nm or less may also be preferably used. As the wet process silica, a wet process silica having an average primary particle size of 50 nm or less, preferably 3 to 40 nm, and an average aggregated particle size of 5 to 50 μm, is preferred, and it is preferable to use wet process silica fine particles obtained by micropulverizing the aforementioned wet process silica to an average secondary particle size of 500 nm or less, preferably about 20 to 200 nm, in the presence of a cationic compound.

Since a wet process silica produced by a conventional method has an average aggregated secondary particle size of 1 μm or greater, this may be micropulverized before use. As the pulverization method, a wet dispersion method of mechanically pulverizing silica which is dispersed in an aqueous medium is preferred. In this case, since the initial viscosity increase of the dispersion liquid is suppressed so that dispersion at high concentration is made possible, and the pulverization/dispersion efficiency is increased so that the particles can be pulverized to even finer particles, a precipitation process silica having an oil absorption amount of 210 ml/100 g or less and an average aggregated secondary particle size of 5 μm or greater is preferred. When a highly concentrated dispersion liquid is used, the productivity of the inkjet recording medium is also enhanced. The oil absorption amount is measured based on the descriptions of JIS K-5101, the disclosure of which is incorporated by reference in its entirety.

In regard to a specific method for obtaining wet process silica fine particles having an average secondary particle size of 500 nm or less, first, wet silica and a cationic compound are mixed in water (the addition may be carried out sequentially, irrespective of the order, or simultaneously), or the respective dispersions or aqueous solutions of the two components are mixed, and the resulting mixture is dispersed by using at least one of dispersing apparatuses such as a saw-toothed blade type dispersing machine, a propeller blade type dispersing machine and a rotor-stator type dispersing machine, to obtain a preliminary dispersion liquid. At this time, an appropriate low boiling point solvent or the like may be further added according to necessity. It is more preferable to have a higher solids concentration of the preliminary dispersion liquid. However, if the concentration is too high, dispersion becomes impossible, and therefore, a preferred range of the concentration is 15 to 40% by mass, and more preferably 20 to 35% by mass. Subsequently, by imparting stronger mechanical energy, a dispersion of wet process silica fine particles having an average secondary particle size of 500 nm or less is obtained. As the means for imparting mechanical energy, known means such as, for example, media mills such as a ball mill, a bead mill and a sand grinder; pressure type dispersing machines such as a high pressure homogenizer and an ultrahigh pressure homogenizer; an ultrasonic dispersing machine, and a thin film revolving type dispersing machine, may be employed.

In the dispersion of gas phase process silica and wet process silica, a cationic compound may be used.

Examples of the cationic compound include a cationic polymer or a water-soluble metal compound.

As for the cationic polymer, polyethyleneimine, polydiallylamine, polyallylamine, alkylamine polymers, or those polymers having a primary to tertiary amino group or a quaternary ammonium salt group described in JP-A No. 59-20696, JP-A No. 59-33176, JP-A No. 59-33177, JP-A No. 59-155088, JP-A No. 60-11389, JP-A No. 60-49990, JP-A No. 60-83882, JP-A No. 60-109894, JP-A No. 62-198493, JP-A No. 63-49478, JP-A No. 63-115780, JP-A No. 63-280681, JP-a No. 1-40371, JP-A No. 6-234268, JP-A No. 7-125411, JP-A No. 10-193776 and the like, are preferred. Particularly, diallylamine derivatives are preferred as the cationic polymer. From the viewpoints of dispersibility and dispersion viscosity the molecular weight of these cationic polymers is preferably about 2000 to 100,000, and particularly preferably about 2000 to 30,000.

As the cationic polymer, the compounds described in paragraphs [0023] to [0031] of JP-A No. 2008-246988 may also be suitably mentioned.

As for the water-soluble metal compound, for example, water-soluble polyvalent metal salts may be mentioned, and among them, compounds of aluminum or a Group 4A metal in the Periodic Table (for example, zirconium and titanium) are preferred. Particularly preferred are water-soluble aluminum compounds. As for the water-soluble aluminum compounds, for example, as inorganic salts, aluminum chloride or a hydrate thereof, aluminum sulfate or a hydrate thereof, ammonium alum, and the like may be mentioned. Furthermore, a basic polyaluminum hydroxide compound, which is an inorganic aluminum-containing cationic polymer, is also preferred. Details of the basic polyaluminum hydroxide compound will be described later.

As alumina, γ-alumina which is γ-type crystalline aluminum oxide is preferred, and in particular δ-group crystals are preferred. While it is possible to reduce γ-alumina to the primary particle size of about 10 nm, usually a preferable product is obtained by pulverizing secondary particle crystals having a size of several thousand to several tens of thousand nanometers to an average secondary particle size of 500 nm or less, and preferably about 20 to 300 nm, using an ultrasonic or high pressure homogenizer, a counter-collision jet pulverizer or the like.

Alumina hydrate is represented by $Al_2O_3.nH_2O$ (n=1 to 3), and the compound with n being 1 is alumina hydrate of boehmite structure, while the compound with n being greater than 1 and equal to or less than 3 is alumina hydrate of pseudoboehmite structure. The alumina hydrate may be obtained by known production methods such as hydrolysis of aluminum alkoxide such as aluminum isopropoxide, neutralization of an aluminum salt with alkali, or hydrolysis of aluminate. The average secondary particle size of alumina hydrate is preferably 500 nm or less, and more preferably 20 to 300 nm.

The above-described alumina and alumina hydrate may be used in the form of a dispersion liquid dispersed with a known dispersant such as acetic acid, lactic acid, formic acid or nitric acid.

The content of the inorganic fine particles in the single coating film-forming liquid is preferably in the range of 5 to 15% by mass, and more preferably in the range of 7 to 13% by mass, based on the solid contents in the forming liquid, from the viewpoints of forming a porous structure with high porosity and imparting ink absorbability.

—Acetoacetyl-Modified Polyvinyl Alcohol—

The coating film-forming liquid contains at least one acetoacetyl-modified polyvinyl alcohol (acetoacetyl-modified PVA). When the liquid contains an acetoacetyl-modified PVA, cracks in the finally formed ink receiving layer or a decrease in the water resistance can be prevented.

The acetoacetyl-modified PVA may be produced according to a known method such as a reaction between polyvinyl alcohol and diketene. The degree of acetoacetylation is preferably in the range of 0.1 to 20% by mole, and more preferably in the range of 1 to 15% by mole, from the viewpoints of a decrease in brittleness such as cracks, and enhancement of water resistance, and the degree of saponification is preferably 80% by mole or more, and more preferably 85% by mole or more.

The average degree of polymerization of the acetoacetyl-modified PVA is preferably in the range of 500 to 5000, and particularly preferably in the range of 1000 to 4500.

The content of the acetoacetyl-modified PVA in the single coating film-forming liquid is preferably in the range of 15 to 30% by mass, and more preferably in the range of 15 to 25% by mass, based on the inorganic fine particles. When the content of the acetoacetyl-modified PVA is 15% by mass or more, film defects such as cracks after the coating (particularly, during drying) may be prevented, and when the content is 30% by mass or less, it is advantageous from the viewpoint of ink absorbability.

—Other Components—

In addition to the above-described components, the coating film-forming liquid may contain, within the range in which of the effects of the invention is not impaired, other components such as cationic mordants such as the later-described cationic polymers, surfactants of cationic, anionic, nonionic, amphoteric, fluorine and silicone types, or high boiling point organic solvents, as necessary.

Moreover, such other components may be used also in at least one of the first solution and the second solution that will be described later.

Furthermore, the preparation of the coating film-forming liquid containing inorganic fine particles and an acetoacetyl-modified PVA may be carried out by preparing an aqueous dispersion of the inorganic fine particles (for example, gas phase process silica) in advance, and adding the prepared aqueous dispersion to a PVA-containing aqueous solution. Alternatively, the PVA-containing aqueous solution may be added to the aqueous dispersion of inorganic fine particles, or the two liquids may be mixed simultaneously. Furthermore, the inorganic fine particles may also be used in a powdered form, instead of the aqueous dispersion of inorganic fine particles, and may be added to the PVA-containing aqueous solution as described above.

After mixing the inorganic fine particles and the acetoacetyl-modified PVA, this mixed liquid may be finely granulated by using a dispersing machine, thereby obtaining an aqueous dispersion having an average particle size of 50 nM or less.

Here, the solvent that is used in the preparation of the coating film-forming liquid is as described above.

Coating after coating of the coating film-forming liquid may also be carried out by using a known coating method. Examples of the known coating method include methods of using an extrusion die coater, an air doctor coater, a blade coater, a rod coater, a knife coater, a squeeze coater, a reverse roll coater, a bar coater, or the like.

Drying of the coating film-forming liquid is generally carried out at 50 to 180° C., and for 0.5 to 10 minutes (particularly, 0.5 to 5 minutes). This drying time naturally varies with the amount of coating, but the above-mentioned range is appropriate.

The thickness of the coating film (ink receiving layer) formed by using a single coating film-forming liquid is preferably in the range of 15 to 50 μm, and more preferably in the range of 20 to 40 μm, from the viewpoints of ink absorbability, improvement of brittleness, particularly cracks during the drying of coating.

B. Case where Coating Film Formation is Carried Out with Two Coating Film-Forming Liquids In this case, it is preferable to perform simultaneous multilayer coating of a first solution containing at least inorganic fine particles and an acetoacetyl-modified polyvinyl alcohol (hereinafter, may also be referred to as "first ink receiving layer-coating liquid"), and a second solution containing at least inorganic fine particles and polyvinyl alcohol excluding acetoacetyl-modified polyvinyl alcohol (hereinafter, may also be referred to as "second ink receiving layer-coating liquid"), such that the second solution is disposed on top of the first solution, and to form the coating film as a laminate.

Thereby, a first coating film formed with the first solution (hereinafter, may be simply referred to as "first coating film") and a second coating film formed with the second solution (hereinafter, may be simply referred to as "second coating film") are formed as coating films, sequentially from the side closer to the support. Moreover, hereinafter, the first and second coating solutions for ink receiving layer may be collectively simply referred to as "coating liquids for ink receiving layer."

(First Solution)

The first solution is prepared using at least inorganic fine particles and an acetoacetyl-modified polyvinyl alcohol, and as will be further described later, may also be prepared using a water-soluble cellulose derivative. The first solution constitutes an ink receiving layer which absorbs and receives the ink provided from an external source. The first solution may also contain other components as well, if necessary.

Details of the inorganic fine particles and acetoacetyl-modified PVA used in the first solution are as described above.

The content of the inorganic fine particles in the first solution is preferably in the range of 5 to 15% by mass based on the solids in the first solution, from the viewpoints of forming a porous structure with high porosity and imparting ink absorbability.

Furthermore, the content of the acetoacetyl-modified PVA in the first solution is preferably in the range of 10 to 30% by mass, and more preferably in the range of 15 to 25% by mass, based on the inorganic fine particles. If the content of the acetoacetyl-modified PVA is 10% by mass or more, film defects such as cracks after coating (particularly, during drying) are prevented, and the bleeding (particularly, water resistance) after recording may be suppressed. If the content is 30% by mass or less, it is advantageous from the viewpoint of ink absorbability.

The preparation of the first solution (first ink receiving layer-coating liquid) is carried out, for example, as follows: silica fine particles having an average primary particle size of 10 nm or less are added into water (e.g., 10 to 15% by mass), and this is dispersed with a high speed rotating wet colloid mill (e.g., CLEARMIX (manufactured by M Technique Co., Ltd.)), under the conditions of high speed rotation at preferably 5000 to 20,000 rpm, for example, 10,000 rpm for a period of preferably 10 to 30 minutes, for example, 20 minutes. Subsequently, an aqueous solution containing an acetoacetyl-modified PVA was added thereto, and dispersion is further carried out under the conditions as described above to obtain an aqueous dispersion. The resulting aqueous dispersion is a homogeneous sol, and when the dispersion is applied to a support by the coating method described below, a porous layer having a three-dimensional network structure may be obtained.

The preparation of the first solution containing inorganic fine particles and an acetoacetyl-modified PVA may be carried out by preparing an aqueous dispersion of the inorganic fine particles (for example, gas phase process silica) in advance, and adding the prepared aqueous dispersion to a PVA-containing aqueous solution. Alternatively, the PVA-containing aqueous solution may be added to the aqueous dispersion of inorganic fine particles, or the two liquids may be mixed simultaneously. Furthermore, the inorganic fine particles may also be used in a powdered form, instead of the aqueous dispersion of inorganic fine particles, and may be added to the PVA-containing aqueous solution as described above.

After mixing the inorganic fine particles and the acetoacetyl-modified PVA, this mixed liquid may be finely granulated by using a dispersing machine, whereby an aqueous dispersion having an average particle size of 50 nm or less is obtained.

Here, the solvent used in the preparation of the first solution is as described above. In this regard, the same also applies when preparing the second solution described below.

Coating of the first solution may be carried out by using a known coating method. Examples of the known coating method include methods of using an extrusion die coater, an air doctor coater, a blade coater, a rod coater, a knife coater, a squeeze coater, a reverse roll coater, a bar coater, or the like.

Drying of the ink receiving layer-coating liquid after coating is generally carried out at 50 to 180° C. for 0.5 to 10 minutes (particularly, 0.5 to 5 minutes). This drying time naturally varies with the amount of coating, but the above-mentioned range is appropriate.

The thickness of the first coating film is preferably in the range of 10 to 35 μm, and more preferably in the range of 25 to 32 μm, in view of reducing brittleness and cracking during drying of the coating.

(Second Solution)

The second solution is prepared by using at least inorganic fine particles and polyvinyl alcohol excluding acetoacetyl-modified polyvinyl alcohol, and as described below, may also be prepared by using a water-soluble cellulose derivative. The second solution forms an ink receiving layer which absorbs and receives the ink provided from an external source. The second solution may also contain other components as well, if necessary.

The second solution contains at least one type of inorganic fine particles. As the inorganic fine particles that can be used in the second solution, the same inorganic fine particles as those usable in the preparation of the first solution may be used. Among them, silica particles are preferred, and gas phase process silica is more preferred.

The content of the inorganic fine particles in the second solution is preferably in the range of 5 to 15% by mass based on the solids in the second solution, from the viewpoints of forming a porous structure with high porosity and imparting ink absorbability.

—Polyvinyl Alcohol—

The second solution contains at least one polyvinyl alcohol (hereinafter, may be simply abbreviated to "PVA") other than the acetoacetyl-modified PVA. If the second solution contains an acetoacetyl-modified PVA, when a curing solution is applied in the below-described process for applying a curing solution, the "water-soluble multifunctional compound having two or more amino groups in the molecule" in the curing solution directly contacts with the acetoacetyl-modified PVA contained in the second solution, so that the viscosity increases and the coating property, that is the state of the coated surface after coating is deteriorated.

The polyvinyl alcohol (PVA) contained in the second solution may be a PVA which does not contain an acetoacetyl group capable of reacting with the "water-soluble multifunctional compound having two or more amino groups in the molecule" described below, in view of avoiding viscosity increase at the time of coating due to the contact with the curing solution as will be described, as well as deterioration of the state of the coated surface and coating defects. Examples of such a PVA include polyvinyl alcohol, and various modified polyvinyl alcohols other than the acetoacetyl-modified PVA. Among these, polyvinyl alcohol is preferred, and particularly, a polyvinyl alcohol having an average degree of polymerization of 1500 or greater is preferred. When such a PVA is used, the film strength of the ink receiving layer is enhanced.

The content of the polyvinyl alcohol (except for acetoacetyl-modified PVA) in the second solution is preferably in the range of 15 to 30% by mass, and more preferably in the range of 15 to 25% by mass, based on the inorganic fine particles, from the viewpoint of ink absorbability.

The preparation of the second solution (second ink receiving layer-coating liquid) may be carried out by the same method as in the case of preparing the first solution (first ink receiving layer-coating liquid).

Coating of the second solution may be carried out by using a known coating method, and the same coating methods as in the case for the first solution may be applied. The second solution may be simultaneously multi-layer coated with the first solution, and in this case, coating methods of using, for example, an extrusion die coater, a curtain flow coater, or the like are preferred.

Furthermore, drying after coating of the second solution may be carried out in the same manner as in the case of the first solution.

The thickness of the second coating film is preferably in the range of 3 to 15 μm, and more preferably in the range of 3 to 10 μm, from the viewpoints of suppressing cracks during drying of the coating, and coating defects.

The ratio of the thickness of the second coating film to the thickness of the first coating film (second coating film/first coating film) is not particularly limited, but from the viewpoint of balancing ink absorbability and the suppression of coating defects, the ratio is preferably set in the range of 1/9 to 4/6, and more preferably in the range of 1/9 to 3/7.

—Water-Soluble Cellulose Derivative—

At least one of the ink receiving layers which constitute the inkjet recording medium according to the invention is preferably constituted by using a water-soluble cellulose derivative. When the ink receiving layer contains a water-soluble cellulose derivative, a good state of coated surface may be obtained at the time of coating, and the bleeding occurring after an image is recorded on the ink receiving layer may be suppressed, which results in improvement of moisture resistance.

Therefore, the coating film-forming liquid may also contain at least one water-soluble cellulose derivative.

Examples of the water-soluble cellulose derivative include methylcellulose, ethylcellulose, hydroxymethylcellulose, hydroxyethylcellulose, hydroxypropylcellulose, hydroxyethylmethylcellulose, hydroxypropylmethylcellulose, carboxymethylcellulose, carboxyethylcellulose, and aminoethylcellulose. However, the examples should not be limited to the above.

It is preferable that the water-soluble cellulose derivative is contained in the single coating film-forming liquid, or in at least one of the first solution and the second solution described below. However, from the viewpoints of coating liquid stability, suppression of coating defects during drying, and image density, it is preferable that the cellulose derivative is contained in the first solution in the case of using two coating film-forming liquids. Furthermore, an aspect in which both the first solution and the second solution contain the cellulose derivative is also preferable.

The content of the water-soluble cellulose derivative in the single coating film-forming liquid or the first solution, is preferably in the range of 0.5 to 5% by mass, and more preferably in the range of 0.5 to 2% by mass, based on the inorganic fine particles in the solution. If the content of the water-soluble cellulose derivative is 0.5% by mass or more, the bleeding after recording can be suppressed, while if the content is 5% by mass or less, it is advantageous in view of coating liquid stability.

In regard to the method for manufacturing an inkjet recording medium of the invention, it is also acceptable that the first solution does not contain a water-soluble cellulose derivative, and the second solution contains at least one water-soluble cellulose derivative. When the second solution, or the first and second solutions contain a water-soluble cellulose derivative, coating defects such as cracks which may occur after coating (particularly, during drying) are prevented, and the bleeding after recording is suppressed (water resistance is particularly improved).

As the water-soluble cellulose derivatives that are usable in the second solution, there may be mentioned the same ones as those usable in the preparation of the first solution, and preferred aspects are also similar.

—Water-Soluble Aluminum Compound—

It is preferable that at least one layer of the ink receiving layer which constitutes the inkjet recording medium according to the invention, is constituted by using a water-soluble aluminum compound. When the ink receiving layer contains a water-soluble aluminum compound, water resistance is enhanced, and the bleeding of ink (image) under the influence of moisture such as, for example, high humidity, is suppressed.

Therefore, it is also acceptable that the coating film-forming liquid contains at least one water-soluble aluminum compound.

In the case of using the dual coating film-forming liquids in the formation of the dual coating films, it is preferable that the first solution contain a water-soluble aluminum compound. When the first solution contains a water-soluble aluminum compound, water resistance is enhanced, and the bleeding of ink (image) under the influence of moisture such as, for example, high humidity is suppressed.

Examples of the water-soluble aluminum compound include, as inorganic salts, aluminum chloride or a hydrate thereof, aluminum sulfate or a hydrate thereof, and ammonium alum. Furthermore, examples of the water-soluble aluminum compound include a basic polyaluminum hydroxide compound, which is an inorganic aluminum-containing cationic polymer. From the viewpoint of ozone resistance of dyes, the basic polyaluminum hydroxide compound is particularly preferred.

The basic polyaluminum hydroxide compound is a water-soluble polyaluminum hydroxide whose main component is represented by the following formula (1), formula (2) or formula (3), and which stably contains a basic, high molecular weight polynuclear condensed ion, such as $[Al_6(OH)_{15}]^{3+}$, $[Al_8(OH)_{20}]^{4+}$, $[Al_{13}(OH)_{34}]^{5+}$ or $[Al_{21}(OH)_{60}]^{3+}$:

$$[Al_2(OH)_nCl_{6-n}]_m \qquad \text{Formula (1)}$$

$$[Al(OH)_3]_nAlCl_3 \qquad \text{Formula (2)}$$

$$Al_n(OH)_mCl_{(3n-m)}\ [0<m<3n] \qquad \text{Formula (3)}$$

These are marketed from Taki Chemical Co., Ltd. under the name of polyaluminum chloride (PAC) as water treating agents; from Asada Chemical Co., Ltd. under the name of polyaluminum hydroxide (Paho); from Rikengreen Co., Ltd. under the name of PURACHEM WT; and from other makers for similar purposes, and products of various grades can be used.

The content of the water-soluble aluminum compound is, in the case where the compound is contained in the single coating film-forming liquid, preferably in the range of 1 to 15% by mass, and more suitably in the range of 3 to 10% by mass, based on the inorganic fine particles. Furthermore, in the case where the compound is contained in the second solution, the content is preferably in the range of 2 to 20% by mass, and more preferably in the range of 3 to 15% by mass, based on the inorganic fine particles. When the content of the water-soluble aluminum compound is equal to or greater than the lower limit value, water resistance is enhanced, and the bleeding occurring under the influence of the environment (particularly, high humidity) after recording may be suppressed. A content equal to or less than the upper limit value is advantageous from the viewpoint of coating liquid stability.

<Process for Applying Curing Solution>

The process for applying a curing solution is a process of applying a curing solution containing a water-soluble multifunctional compound having two or more amino groups in the molecule (water-soluble multifunctional crosslinking agent) onto the coating film, either simultaneously with the formation of the coating film (preferably including the first coating film and the second coating film; the same applies hereinafter), or before the coating film undergoes decreasing-rate drying during the drying of the coating film, in the process for forming a coating film.

By performing the present process, the film strength of the coating film in the constant-rate drying state, which is prior to the decreasing-rate drying state of the coating film, may be enhanced. In other words, a good state of coated surface may be obtained (coating property is maintained), and an ink receiving layer having reduced brittleness such as cracks after coating (particularly, during drying) and excellent resistance to ink (image) bleeding (particularly, water resistance) may be obtained.

The curing solution is prepared by using at least a water-soluble multifunctional crosslinking agent, and is used as a crosslinking agent solution which crosslinks and cures at least the coating film (in the case of using the two coating film-forming liquids, at least the first coating film). Furthermore, the curing solution may also contain, according to necessity, other components such as a surfactant or a crosslinking agent for a binder component other than acetoacetyl-modified PVA. The curing solution is prepared by, for example, mixing a water-soluble multifunctional crosslinking agent and a solvent. As for the solvent, water, an organic solvent, or a mixed solvent thereof may be used. As examples of the organic solvent, those usable in the preparation of the undercoat layer-forming liquid may be used.

The curing solution is also preferably a basic solution with pH 7.1 or greater, and from the viewpoint of the acceleration of crosslinking, the pH of the aforementioned coating film-forming liquid is preferably in the range of 3 to 5.

In the process for applying a curing solution according to the invention, the curing solution may be applied during drying of the coating film, before the coating film exhibits decreasing-rate drying. By drying the coating film after application of the curing solution, an ink receiving layer is obtained as a result of crosslinking and curing of the coating film.

The application of the curing solution (crosslinking agent-containing solution) may be carried out by methods including immersion of the coated support in the crosslinking agent solution, coating of the crosslinking agent solution, spraying of the crosslinking agent solution with a sprayer, or the like.

The term "before . . . exhibits decreasing-rate drying" is usually a period of several minutes immediately after the coating, and in this time period, constant-rate drying is exhibited, which refers to a phenomenon in which the content of the solvent in the coating film decreases proportionally to time. In regard to such period showing constant-rate drying, description is given in the Handbook of Chemical Engineering (p. 707 to 712, published by Maruzen Co., Ltd., Oct. 25, 1980), the disclosures of which are incorporated herein by reference in their entirety.

In the case where the coating film of the ink receiving layer-coating liquid is formed by multi-layer coating of the first ink receiving layer-coating liquid and the second ink receiving layer-coating liquid, after the coating of the aforementioned first ink receiving layer-coating liquid and second ink receiving layer-coating liquid, the solution may be applied by immersing the coating film in the aforementioned curing solution, or by coating or spraying the curing solution, while the coating film (first coating film and second coating film) is exhibiting constant-rate drying.

If the curing solution (crosslinking agent-containing solution) is to be applied by coating, the coating may be carried out by utilizing known coating methods of using a curtain flow coater, an extrusion die coater, an air doctor coater, a blade coater, a rod coater, a knife coater, a squeeze coater, a reverse roll coater, a bar coater, or the like, in addition to the methods described above. Among them, a method which does not involve direct contact of the coater with the coating film through the use of an extrusion die coater, a curtain flow coater, a bar coater or the like, is preferred.

The amount of the curing solution applied onto the coating film is generally in the range of 0.01 to 10 $g/m^2$, and preferably in the range of 0.05 to 5 $g/m^2$, in terms of the amount of crosslinking agent (including the water-soluble multifunctional crosslinking agent and other crosslinking agents such as boric acid). After the coating of the curing solution, the coating film is generally heated at 40 to 180° C. for 0.5 to 30 minutes, to be dried and cured. It is preferable to heat the coating film at 40 to 150° C. for 1 to 20 minutes.

In the process for applying a curing solution according to the invention, the curing solution may be applied simultaneously with the forming of the coating film (preferably the first coating film and the second coating film) as described above, that is simultaneously with the coating of the coating film-forming liquid (preferably the first solution and the second solution). In this case, the coating film-forming liquid (ink receiving layer-coating liquid) and the curing solution (crosslinking agent-containing solution) are simultaneously applied to the support such that the coating film-forming liquid (suitably, file first solution) is in contact with the support, and the coating film-forming liquid is cured. In this case, the simultaneous multilayer coating of the ink receiving layer-coating liquid and the crosslinking agent-containing solution may be carried out, for example, by a coating method of using an extrusion die coater or a curtain flow coater. Furthermore, drying after the simultaneous multilayer coating is generally carried out by heating at 40 to 150° C. for 0.5 to 10 minutes, and thus the coating film is cured. It is preferable to further heat the coating film at 40 to 100° C. for 0.5 to 5 minutes.

When simultaneous multilayer coating is carried out with, for example, an extrusion die coater, two or three solutions form a multilayer on the extrusion die coater, that is, before being transferred onto the support. For this reason, in the method for manufacturing an inkjet recording medium of the invention, more favorable effects may be obtained in the case of performing simultaneous multilayer coating.

It is possible for the ink receiving layer obtained after the coating and drying to be provided with enhanced surface smoothness, transparency and film strength, by passing the ink receiving layer through between roll nips under heating and pressure using, for example, a super calendar or a gloss calendar. However, since such treatment decreases the porosity (that is, since the ink absorbability is decreased), it is important to perform the treatment under conditions which lead to only a small decrease in the porosity.

The thickness of the ink receiving layer formed on the support when it is composed of one layer is preferably in the range of 10 to 35 μm, and the total thickness of the ink receiving layer composed of two or more layers is preferably in the range of 10 to 50 μm.

Here, the respective components of the curing solution, such as the water-soluble multifunctional crosslinking agent, will be described.

—Water-Soluble Multifunctional Compound—

The curing solution according to the invention contains at least one water-soluble multifunctional compound having two or more amino groups in the molecule (water-soluble multifunctional crosslinking agent). This water-soluble multifunctional crosslinking agent functions as a crosslinking agent which crosslinks the aforementioned acetoacetyl-modified PVA. According to the invention, since this water-soluble multifunctional crosslinking agent is contained in a third solution so that the agent does not directly contact with the acetoacetyl-modified PVA at the time of forming the ink receiving layer, coating defects such as cracks which may occur after coating (particularly, during drying) are prevented, and the bleeding after recording can be suppressed (particularly, water resistance is improved).

As the water-soluble multifunctional compound having two or more amino groups in the molecule, for example, amine compounds and hydrazine compounds may be mentioned.

Examples of the amine compounds include ethylenediamine, propylenediamine, trimethylenediamine, tetramethylenediamine, pentamethylenediamine, hexamethylenediamine, isophoronediamine, dicyclohexylmethane-4,4'-diamine, phenylenediamine, diethylenetriamine, triethylenetetramine, triaminopropane, and polymers having amino groups (for example, polyvinylamine, polyethyleneimine, polyallylamine).

Examples of the hydrazine compounds include carbohydrazide, thiocarbohydrazide, ethylene-1,2-dihydrazine, propylene-1,3-dihydrazine, butylene-1,4-dihydrazine, oxalic acid dihydrazide, propionic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, salicylic acid dihydrazide, isophthalic acid dihydrazide, 4,4'-oxybenzenesulfonylhydrazide, and vinyl polymers having hydrazide groups (for example, aminopolyacrylamide).

The content of the water-soluble multifunctional crosslinking agent in the curing solution may vary with the thickness of the coating film, the amount of the acetoacetyl-modified PVA, or the like, but the content is preferably in the range of 0.1 to 5% by mass, and more preferably in the range of 1 to 3% by mass, relative to the amount of the acetoacetyl-modified PVA in the coating film-forming liquid (preferably in the first solution). When the content of the water-soluble multifunctional crosslinking agent is 0.1% by mass or more, coating defects such as cracks which may occur after coating (particularly, during drying) are prevented, and the bleeding after recording can be suppressed (particularly, water resistance is improved). A content of 5% by mass or less is advantageous from the viewpoint of coating liquid stability.

In regard to the process for applying a curing solution according to the invention, a method of forming an ink receiving layer composed of two layers or more by carrying out simultaneous multilayer coating of applying the coating film-forming liquid (suitably, the first solution and the second solution) and simultaneously applying the curing solution in the process for forming a coating film described above, is more preferred.

In this case, the process for applying a curing solution may be carried out such that, when a water-soluble multifunctional crosslinking agent is applied onto the coating film by using a curing solution, inorganic fine particles and polyvinyl alcohol (except for acetoacetyl-modified PVA) are further contained in the curing solution to further form a curable coating film on the coating film.

Specifically, when a coating film is formed using the single coating film-forming liquid, a curable coating film is further formed on the coating film, thereby obtaining an inkjet recording medium in which an ink receiving layer constituted of a dual layer structure is provided on a support. Furthermore, when a coating film is formed using the two coating film-forming liquids, a curable coating film is further formed on the second coating film, thereby obtaining an inkjet recording medium in which an ink receiving layer constituted of a triple layer structure (the curable coating film also serves as the ink receiving layer) is provided on a support.

That is, from the viewpoints of maintaining the crosslinking curing reaction of the coated film (preferably the second coating film), and avoiding brittleness such as cracks or ink bleeding (particularly, a decrease in water resistance), it is preferable to perform simultaneous multilayer coating of the curing solution which contains at least a water-soluble multifunctional crosslinking agent, inorganic particles and polyvinyl alcohol excluding acetoacetyl-modified PVA, on a support. Furthermore, the water-soluble cellulose derivative which is used in combination with the acetoacetyl-modified polyvinyl alcohol may be contained, when the coating film has a dual layer structure as described above, into one layer or two or more layers selected from three layers of the first coating film, the second coating film and the curable coating film. However, since it is preferable to form such a composition that a water-soluble multifunctional crosslinking agent is not present at a portion at which the water-soluble cellulose derivative is contained together with acetoacetyl-modified polyvinyl alcohol, it is preferable to include the water-soluble cellulose derivative in at least the first solution.

Specifically, a method may be adopted which includes forming multiple layers including a first coating film, a second coating film and a curable coating film on a support by performing, on the support, simultaneous multilayer coating of a first solution containing at least inorganic fine particles and an acetoacetyl-modified polyvinyl alcohol, a second solution containing at least inorganic fine particles and polyvinyl alcohol excluding acetoacetyl-modified polyvinyl alcohol, and a curing solution containing at least a water-soluble multifunctional compound having two or more amino groups in the molecules, inorganic fine particles, and polyvinyl alcohol excluding acetoacetyl-modified polyvinyl alcohol, such that a positional relationship is obtained among the first solution, the second solution and the curing solution in this sequence from the support side, wherein the water-soluble cellulose derivative is incorporated into at least one of the first solution, the second solution and the curing solution.

In this case, the curing solution is prepared using at least a water-soluble multifunctional crosslinking agent, inorganic fine particles and polyvinyl alcohol excluding acetoacetyl-modified PVA, and if necessary, other components may further be used. The preparation of the curing solution containing inorganic fine particles and polyvinyl alcohol (the third ink receiving layer-coating liquid) may be carried out by the same method as in the case of preparing the first solution (first ink receiving layer-coating liquid).

Details of the inorganic fine particles, polyvinyl alcohol excluding acetoacetyl-modified polyvinyl alcohol and other components, which constitute the curing solution, are the same as in the case the aforementioned first solution and second solution, and preferred aspects are also similar.

The content of the inorganic fine particles (preferably, silica particles (particularly, gas phase process silica)) in the curing solution is preferably in the range of 5 to 15% by mass, and more preferably in the range of 7 to 13% by mass, based on the solids in the curing solution, from the viewpoints of ink absorbability and coating liquid stability.

The content of the polyvinyl alcohol excluding acetoacetyl-modified PVA in the curing solution is preferably in the range of 15 to 30% by mass, and more preferably in the range of 15 to 25% by mass, based on the inorganic fine particles, from the viewpoints of ink absorbability and coating liquid stability.

In the case of multilayer coating, the thicknesses of the first coating film, the second coating film and the third coating film are not particularly limited, but the thickness ratio of the third coating film/second coating film/first coating film is preferably 1/1/7 to 4/1/5, from the viewpoints of coating defects and the brittleness after coating.

Hereinafter, preferable exemplary embodiments of the invention will be described, without an intention to limit the scope of the invention.

<1> A method for manufacturing an inkjet recording medium, the method including forming an undercoat layer by applying an undercoat layer-forming liquid containing a binder resin and a water-soluble divalent metal salt on a support; forming a coating film by coating a coating film-forming liquid containing at least inorganic fine particles and an acetoacetyl-modified polyvinyl alcohol on the undercoat layer; and applying a curing solution containing a water-soluble multifunctional compound having two or more amino groups in the molecule onto the coating film, either simultaneously with the forming of the coating film, or before the coating film undergoes decreasing-rate drying during drying of the coating film.

<2> The method for manufacturing an inkjet recording medium according to <1>, wherein the curing solution further contains inorganic fine particles and polyvinyl alcohol excluding acetoacetyl-modified polyvinyl alcohol.

<3> The method for manufacturing an inkjet recording medium according to <1> or <2>, wherein the coating film-forming liquid includes a first solution containing at least inorganic fine particles and an acetoacetyl-modified polyvinyl alcohol, and a second solution containing at least inorganic fine particles and polyvinyl alcohol excluding acetoacetyl-modified polyvinyl alcohol, and the forming of the coating film includes forming a laminate of the coating film by performing simultaneous multilayer coating such that the second solution is disposed above the first solution.

<4> The method for manufacturing an inkjet recording medium according to any one of <1> to <3>, wherein the coating film-forming liquid contains a water-soluble cellulose derivative, and when the coating film-forming liquid includes a first solution and a second solution, at least one of the first solution and the second solution contains a water-soluble cellulose derivative.

<5> The method for manufacturing an inkjet recording medium according to any one of <1> to <4>, wherein the coating film-forming liquid contains a water-soluble aluminum compound.

<6> The method for manufacturing an inkjet recording medium according to any one of <3> to <5>, wherein the curing solution further contains inorganic fine particles and polyvinyl alcohol excluding acetoacetyl-modified polyvinyl alcohol, and layers of the coating film are formed on the undercoat layer by performing simultaneous multilayer coating of the first solution, the second solution and the curing solution above the undercoat layer formed on the support, such that a positional relationship is obtained among the first solution, the second solution and the curing solution in this sequence from the support side.

EXAMPLES

Hereinafter, the present invention will be more specifically described by way of Examples, but the invention is not intended to be limited to the following Examples as long as the scope is not extended beyond the gist of the invention. In addition, unless stated otherwise, the terms "parts" and "%" are on a mass basis.

Example 1

Production of Support 50 parts of an LBKP formed from acacia and 50 parts of an LBKP formed from aspen were respectively beaten in 300 ml of Canadian Freeness with a disk refiner, to produce pulp slurries. Subsequently, to each of the resulting pulp slurries, 1.3% by mass of cationic starch (trade name: CATO 304L, manufactured by Nippon NSC, Ltd.), 0.15% by mass of anionic polyacrylamide (trade name: POLYAKRON ST-13, manufactured by Seiko PMC Corporation), 0.29% by mass of an alkylketene dimer (trade name: SIZEPINE K, manufactured by Arakawa Chemical Industries, Ltd.), 0.29% by mass of an epoxidated behenic acid amide, and 0.32% by mass of polyamide polyamine epichlorohydrin (trade name: ARAFIX 100, manufactured by Arakawa Chemical Industries, Ltd.) were added, all proportions being relative to the amount of pulp, and 0.12% by mass of an antifoaming agent was further added.

Base paper was produced by making paper from each of these pulp slurries using a Fourdrinier paper machine, pressing the felt surface of the web against a drum dryer cylinder through a dryer canvas, and drying the resultant, with the tensile force of the dryer canvas set at 1.6 kg/cm. Subsequently, 1 g/$m^2$ of polyvinyl alcohol (trade name: KL-118, manufactured by Kuraray Co., Ltd.) was coated on both sides of the base paper using a size press, and drying and a calendar treatment were carried out, to obtain a substrate paper. The basis weight of the obtained substrate paper was 166 g/$m^2$, and the thickness was 160 μm.

The wire surface (rear surface) of the obtained substrate paper was subjected to a corona discharge treatment, and then high density polyethylene was laminated thereon to a thickness of 25 μm by using a melt extruder to form a thermoplastic resin layer having a matt surface (hereinafter, this thermoplastic resin layer surface is referred to as "rear surface"). This rear surface was subjected again to a corona discharge treatment, and then a dispersion prepared by dispersing in water, as antistatic agents, aluminum oxide (trade name: "ALUMINASOL 100", manufactured by Nissan Chemical Industries, Ltd.) and silicon dioxide (trade name: "SNOWTEX O", manufactured by Nissan Chemical Industries, Ltd.) at a mass ratio of 1:2, was applied on the surface to obtain a dried mass of 0.2 g/$m^2$.

Furthermore, the felt surface (front surface) on the side at which a thermoplastic resin layer was not provided, was subjected to a corona discharge treatment, and then a low density polyethylene having a melt flow rate (MFR) of 3.8, which had been prepared so as to contain 10% by mass of anatase titanium dioxide, 0.3% by mass of ultramarine blue (manufactured by Tokyo Printing Ink Manufacturing Co., Ltd.) and 0.08% by mass of a fluorescent brightener (trade name: "WHITEFLOUR PSN CONC", manufactured by Nippon Chemical Industrial Co., Ltd.), was extruded on the surface to a thickness of 25 μm using a melt extruder, to form a high gloss thermoplastic resin layer (hereinafter, this high gloss surface is referred to as the "front surface"). Thus, a water resistant support was produced. The outer shape of the water resistant support was formed to provide a long roll having a width of 1.5 m and a roll length of 3000 m.

(Preparation of Undercoat Layer-Forming Liquid A)

From the composition shown below, (1) deionized, alkali-treated gelatin, (2) ion-exchanged water, (3) magnesium chloride, and (4) methanol were mixed, and the mixture was dispersed using an ultrasonic dispersing machine (manufactured by SMT Corporation), to prepare an undercoat layer-forming liquid A.

| | |
|---|---|
| (1) Deionized, alkali-treated gelatin (isoelectric point: 5.0) | 50.0 parts |
| (2) Ion-exchanged water | 250.0 parts |
| (3) Magnesium chloride | 30 parts |
| (4) Methanol | 670.0 parts |

(Preparation of Ink Receiving Layer-Coating Liquid A1)

From the composition shown below, (1) gas phase process silica fine particles, (2) ion-exchanged water, and (3) SHALLOL DC-902P were mixed, and the mixture was dispersed with an ultrasonic dispersing machine (manufactured by SMT Corporation). Subsequently, the dispersion was heated to 45° C. and maintained for 20 hours. Thereafter, (4) boric acid, (5) a 7 mass % aqueous solution of an acetoacetyl-modified polyvinyl alcohol, and (6) a 10 mass % aqueous solution of a surfactant from the composition shown below, were added at 30° C., to prepare a ink receiving layer-coating liquid A1 (solution A).

—Composition of Ink Receiving Layer-Coating Liquid A1—

| | |
|---|---|
| (1) Gas phase process silica fine particles (inorganic fine particles) (trade name: AEROSIL 300SV, manufactured by Nippon Aerosil Co., Ltd.) | 10.0 parts |
| (2) Ion-exchanged water | 56 parts |
| (3) "SHALLOL DC-902P" (51.5% aqueous solution) (dispersant, manufactured by Dai-ichi Kogyo Seiyaku Co., Ltd.) | 0.8 parts |
| (4) Boric acid (crosslinking agent) | 0.37 parts |
| (5) 7% aqueous solution of acetoacetyl-modified polyvinyl alcohol (trade name: Z210, manufactured by Nippon Synthetic Chemical Industry Co., Ltd.) | 29 parts |
| (6) 10% aqueous solution of surfactant (trade name: EMULGEN 109P, manufactured by Kao Corporation) | 0.6 parts |

(Preparation of Crosslinking Agent Solution 1)

The components of the following composition were dissolved and mixed at normal temperature, to prepare a crosslinking agent solution 1 (curing solution).

| | |
|---|---|
| (1) Ion-exchanged water | 30 parts |
| (2) Adipic acid dihydrazide (water-soluble multifunctional crosslinking agent) | 1 part |
| (3) 10% aqueous solution of surfactant (trade name: EMULGEN, manufactured by Kao Corporation) | 0.5 parts |

(Production of Inkjet Recording Medium)

The front surface of the support obtained as described above was subjected to a corona discharge treatment, and then 10 ml/$m^2$ of the aforementioned undercoat layer-forming liquid A was coated thereon using a wire bar, and was dried at 70° C. for 2 minutes, to form an undercoat layer.

Subsequently, the ink-receiving layer-coating liquid A1 was applied with a slide bead coater to a volume of 200 cc/m2, and was dried by a hot air dryer at 80° C. (air speed 3 m/sec) for 3 minutes. During this period, the coating film exhibited constant-rate drying. Immediately after the drying for 3 minutes, this coating film was immersed in the crosslinking agent solution 1 for 1 second, and was dried at 80° C. for 10 minutes. Thereby, an inkjet recording medium was produced.

Example 2

An inkjet recording medium was produced in the same manner as in Example 1, except that the ink receiving layer-coating liquid A1 for forming a lower layer according to Example 1 was replaced with an inkjet-receiving layer-coating liquid A2 having the following composition.

—Composition of Ink Receiving Layer-Coating Liquid A2—

| | |
|---|---|
| (1) Gas phase process silica fine particles (inorganic fine particles) (trade name: AEROSIL 300SV, manufactured by Nippon Aerosil Co., Ltd.) | 10.0 parts |
| (2) Ion-exchanged water | 56 parts |
| (3) "SHALLOL DC-902P" (51.5% aqueous solution) (dispersant, manufactured by Dai-ichi Kogyo Seiyaku Co., Ltd.) | 0.78 parts |
| (4) Boric acid (crosslinking agent) | 0.37 parts |
| (5) 7% aqueous solution of acetoacetyl-modified polyvinyl alcohol (trade name: Z210, manufactured by Nippon Synthetic Chemical Industry Co., Ltd.) | 29 parts |
| (6) 10% aqueous solution of hydroxypropylcellulose (trade name: NISSO HPC-SSL, manufactured by Nippon Soda Co., Ltd.; water-soluble cellulose derivative) | 3 parts |
| (7) 10% aqueous solution of surfactant (trade name: EMULGEN 109P, manufactured by Kao Corporation) | 0.6 parts |

Example 3

An inkjet recording medium was produced in the same manner as in Example 1, except that the ink receiving layer-coating liquid A1 for forming a lower layer according to Example 1 was replaced with an inkjet-receiving layer-coating liquid A3 having the following composition.

—Composition of Ink Receiving Layer-Coating Liquid A3—

| | |
|---|---|
| (1) Gas phase process silica fine particles (inorganic fine particles) (trade name: AEROSIL 300SV, manufactured by Nippon Aerosil Co., Ltd.) | 10.0 parts |
| (2) Ion-exchanged water | 56 parts |
| (3) "SHALLOL DC-902P" (51.5% aqueous solution) (dispersant, manufactured by Dai-ichi Kogyo Seiyaku Co., Ltd.) | 0.78 parts |
| (4) Boric acid (crosslinking agent) | 0.37 parts |
| (5) 7% aqueous solution of acetoacetyl-modified polyvinyl alcohol (trade name: Z210, manufactured by Nippon Synthetic Chemical Industry Co., Ltd.) | 29 parts |
| (6) 10% aqueous solution of hydroxypropylcellulose (trade name: NISSO HPC-SSL, manufactured by Nippon Soda Co., Ltd.; water-soluble cellulose derivative) | 3 parts |
| (7) Polyaluminum chloride (trade name: ALFINE 83, manufactured by Taimei Chemicals Co., Ltd.) | 1.5 parts |
| (8) 10% aqueous solution of surfactant (trade name: EMULGEN 109P, manufactured by Kao Corporation) | 0.6 parts |

Example 4

Preparation of Ink Receiving Layer-Coating Liquid A3

An ink receiving layer-coating liquid A3 (first solution) was prepared in the same manner as in Example 3.

(Preparation of Ink Receiving Layer-Coating Liquid B1)

An ink receiving layer-coating liquid B1 (second solution) was prepared in the same manner as in the case of the ink receiving layer-coating liquid A1, except that the composition of the ink receiving layer-coating liquid A1 was changed as follows.

—Composition of Ink Receiving Layer-Coating Liquid B1—

| | | |
|---|---|---|
| (1) | Gas phase process silica fine particles (inorganic fine particles) (trade name: AEROSIL 300SV, manufactured by Nippon Aerosil Co., Ltd.) | 10.0 parts |
| (2) | Ion-exchanged water | 56 parts |
| (3) | "SHALLOL DC-902P" (51.5% aqueous solution) (dispersant, manufactured by Dai-ichi Kogyo Seiyaku Co., Ltd.) | 0.78 parts |
| (4) | Boric acid (crosslinking agent) | 0.37 parts |
| (5) | 7% aqueous solution of polyvinyl alcohol (trade name: PVA-235, manufactured by Kuraray Co., Ltd.) | 29 parts |
| (6) | Polyaluminum chloride (trade name: ALFINE 83, manufactured by Taimei Chemicals Co., Ltd.) | 1.5 parts |
| (7) | 10% aqueous solution of surfactant (trade name: EMULGEN 109P, manufactured by Kao Corporation) | 0.6 parts |

—Production of Inkjet Recording Medium—

Both the rear surface of the support and the front surface, opposite to the rear surface, having the undercoat layer described in Example 1 were subjected to a corona discharge treatment, and then multilayer coating was performed with a slide bead coater, such that the ink receiving layer-coating liquid A3 was coated in a coating amount of 160 cc/m$^2$ as a lower layer, and the ink receiving layer-coating liquid B1 was coated in a coating amount of 40 cc/m$^2$ as an upper layer, thereby forming a first coating film formed from the ink receiving layer-coating liquid A3 and the second coating film formed from the ink receiving layer-coating liquid B1 in this sequence from the support side. The coating layers were dried by a hot air dryer at 80° C. (air speed 3 m/sec) for 3 minutes. During this period, the first coating film and the second coating film exhibited constant-rate drying. Immediately after the drying for 3 minutes, these coating films were immersed in the crosslinking agent solution 1 for 1 second, and were dried at 80° C. for 10 minutes. Thereby, an inkjet recording medium was produced.

Example 5

Preparation of Ink Receiving Layer-Coating Liquid A3

An ink receiving layer-coating liquid A3 (first solution) was prepared in the same manner as in Example 3.

(Preparation of Ink Receiving Layer-Coating Liquid C1)

An ink receiving layer-coating liquid C1 (second solution) was prepared in the same manner as in the case of the ink receiving layer-coating liquid A1, except that the composition of the receiving layer-coating liquid A1 was changed as follows.

—Composition of Ink Receiving Layer-Coating Liquid for C1—

| | | |
|---|---|---|
| (1) | Gas phase process silica fine particles (inorganic fine particles) (trade name: AEROSIL 300SV, manufactured by Nippon Aerosil Co., Ltd.) | 10.0 parts |
| (2) | Ion-exchanged water | 56 parts |
| (3) | "SHALLOL DC-902P" (51.5% aqueous solution) (dispersant, manufactured by Dai-ichi Kogyo Seiyaku Co., Ltd.) | 0.78 parts |
| (4) | Boric acid (crosslinking agent) | 0.37 parts |
| (5) | 7% aqueous solution of polyvinyl alcohol (trade name: PVA-235, manufactured by Kuraray Co., Ltd.) | 29 parts |
| (6) | 10% aqueous solution of surfactant (trade name: EMULGEN 109P, manufactured by Kao Corporation) | 0.6 parts |

(Preparation of Ink Receiving Layer-Coating Liquid B2)

An ink receiving layer-coating liquid B2 (curing solution) was prepared in the same manner as in the case of the ink receiving layer-coating liquid A1, except that the composition of the ink receiving layer-coating liquid A1 was changed as follows.

—Composition of Ink Receiving Layer-Coating Liquid B2—

| | | |
|---|---|---|
| (1) | Gas phase process silica fine particles (inorganic fine particles) (trade name: AEROSIL 300SV, manufactured by Nippon Aerosil Co., Ltd.) | 10.0 parts |
| (2) | Ion-exchanged water | 56 parts |
| (3) | "SHALLOL DC-902P" (51.5% aqueous solution) (dispersant, manufactured by Dai-ichi Kogyo Seiyaku Co., Ltd.) | 0.78 parts |
| (4) | Boric acid (crosslinking agent) | 0.37 parts |
| (5) | 7% aqueous solution of polyvinyl alcohol (trade name: PVA-235, manufactured by Kuraray Co., Ltd.) | 29 parts |
| (6) | Adipic acid dihydrazide | 1 part |
| (7) | 10% aqueous solution of surfactant (trade name: EMULGEN 109P, manufactured by Kao Corporation) | 0.6 parts |

(Production of Inkjet Recording Medium)

The front surface of the support having the undercoat layer described in Example 1 was subjected to a corona discharge treatment, and then simultaneous multilayer coating of three liquids was performed with a slide bead coater such that the ink receiving layer-coating liquid A3 was coated so as to be a coating amount of of 140 cc/m$^2$ as the lowermost layer, the ink receiving layer-coating liquid C1 was coated in a coating amount of 20 cc/m$^2$ as an intermediate layer, and the ink receiving layer-coating liquid B2 was coated in a coating amount of 40 cc/m$^2$ as the uppermost layer, thereby forming a first coating film formed from the ink receiving layer-coating liquid A3, a second coating film formed from the ink receiving layer-coating liquid C1, and a third coating film formed from the ink receiving layer-coating liquid B2 in this sequence from the support side. The coating films were dried by a hot air dryer at 80° C. (air speed 3 m/sec) for 10 minutes. Thereby, an inkjet recording medium was produced.

Example 6

An inkjet recording medium was produced in the same manner as in Example 5, except that the ink receiving layer-coating liquid B2 forming the uppermost layer according to Example 5 was replaced with an ink receiving layer-coating liquid B3 as follows.

—Composition of Ink Receiving Layer-Coating Liquid B3—

| | | |
|---|---|---|
| (1) | Gas phase process silica fine particles (inorganic fine particles) (trade name: AEROSIL 300SV, manufactured by Nippon Aerosil Co., Ltd.) | 10.0 parts |
| (2) | Ion-exchanged water | 56 parts |
| (3) | "SHALLOL DC-902P" (51.5% aqueous solution) (dispersant, manufactured by Dai-ichi Kogyo Seiyaku Co., Ltd.) | 0.78 parts |
| (4) | Boric acid (crosslinking agent) | 0.37 parts |
| (5) | 7% aqueous solution of polyvinyl alcohol (trade name: PVA-235, manufactured by Kuraray Co., Ltd.) | 29 parts |
| (6) | 10% aqueous solution of hydroxypropylcellulose (trade name: NISSO HPC-SSL, manufactured by Nippon Soda Co., Ltd.; water-soluble cellulose derivative) | 3 parts |
| (7) | Polyaluminum chloride (trade name: ALFINE 83, manufactured by Taimei Chemicals Co., Ltd.) | 1.5 parts |
| (8) | 10% aqueous solution of surfactant (trade name: EMULGEN 109P, manufactured by Kao Corporation) | 0.6 parts |
| (9) | Adipic acid dihydrazide | 1 part |

Example 7

An inkjet recording medium was produced in the same manner as in Example 5, except that the ink receiving layer-coating liquid A3 for forming the lower layer according to Example 5 was replaced with the inkjet-receiving layer-coating liquid A1 (first solution).

Example 8

The ink receiving layer-coating liquid C1 according to Example 5 was not used, but both the rear surface having an undercoat layer on the support and the front surface of the support opposite to the rear surface were subjected to a corona discharge treatment, and then multilayer coating was performed with a slide bead coater such that the ink receiving layer-coating liquid A3 was coated so as to be a coating amount of 160 cc/$m^2$ as a lower layer, and the ink receiving layer-coating liquid B2 was coated so as to be a coating amount of 40 cc/$m^2$ as an upper layer, thereby to form a coating film formed from the ink receiving layer-coating liquid A3 and a curable coating film formed from the ink receiving layer-coating liquid B2 in this sequence from the support side. The coating films were dried by a hot air dryer at 80° C. (air speed 3 m/sec) for 3 minutes. Thereby, an inkjet recording medium was produced.

Comparative Example 1

Preparation of Undercoat Layer-Forming Liquid B

From the composition shown below, (1) deionized, alkali-treated gelatin, (2) ion-exchanged water, and (3) methanol were mixed, and the mixture was dispersed using an ultrasonic dispersing machine (manufactured by SMT Corporation) to prepare an undercoat layer-forming liquid B.

| | |
|---|---|
| (1) Deionized, alkali-treated gelatin (isoelectric point: 5.0) | 50.0 parts |
| (2) Ion-exchanged water | 280.0 parts |
| (3) Methanol | 670.0 parts |

(Production of Inkjet Recording Medium)

The front surface of the support obtained as described above was subjected to a corona discharge treatment, and then 10 ml/$m^2$ of the undercoat layer-forming liquid B was coated using a wire bar and dried at 70° C. for 2 minutes to form an undercoat layer.

An inkjet recording medium was produced in the same manner as in Example 4, except that the above-described support was used as the support having an undercoat layer.

Comparative Example 2

Preparation of Ink Receiving Layer-Coating Liquid A4

An ink receiving layer-coating liquid A4 was prepared in the same manner as in the case of the ink receiving layer-coating liquid A1 of Example 1, except that the composition of the ink receiving layer-coating liquid A1 was changed as follows.

—Composition of Ink Receiving Layer-Coating Liquid A4—

| | | |
|---|---|---|
| (1) | Gas phase process silica fine particles (inorganic fine particles) (trade name: AEROSIL 300SV, manufactured by Nippon Aerosil Co., Ltd.) | 10.0 parts |
| (2) | Ion-exchanged water | 56 parts |
| (3) | "SHALLOL DC-902P" (51.5% aqueous solution) (dispersant, manufactured by Dai-ichi Kogyo Seiyaku Co., Ltd.) | 0.8 parts |
| (4) | Boric acid (crosslinking agent) | 0.37 parts |
| (5) | 7% aqueous solution of acetoacetyl-modified polyvinyl alcohol (trade name: Z210, manufactured by Nippon Synthetic Chemical Industry Co., LTd.) | 29 parts |
| (6) | Polyaluminum chloride (trade name: ALFINE 83, manufactured by Taimei Chemicals Co., Ltd.) | 1.5 parts |
| (7) | Magnesium chloride | 0.15 parts |
| (8) | 10% aqueous solution of surfactant (trade name: EMULGEN 109P, manufactured by Kao Corporation) | 0.6 parts |

The front surface of the support having an undercoat layer obtained in the Comparative Example 1 was subjected to a corona discharge treatment, and then the inkjet-receiving layer-coating liquid A4 was coated in a coating amount of 200 cc/$m^2$, and dried by a hot air dryer at 80° C. (air speed 3 m/sec) for 10 minutes. An inkjet recording medium was produced without applying a crosslinking agent.

<Evaluation>

The respective inkjet recording media obtained in the above-described Examples and Comparative Examples were subjected to the following evaluations and measurements. The results of the measurements and evaluations are shown in Table 1 set forth below.

(Moisture Resistance (Bleeding))

A lattice-shaped pattern in which magenta and black portions are formed adjacent (length of a side of each inner square is 0.28 mm) was printed to form a 3 cm square image on the respective inkjet recording media using an inkjet printer (trade name: MP970, manufactured by Canon, Inc.) in ambient conditions of 23° C. and 50% RH. Immediately after the printing, the inkjet recording media were transferred to ambient conditions at 23° C. and 90% RH, and were left to stand for 7 days. After 7 days, the inkjet recording media were sufficiently dried under ambient conditions of 23° C. and 50% RH, and then the degree of bleeding was evaluated by visual inspection. The inkjet recording media were ranked according to the following evaluation criteria.

—Evaluation Criteria—

A: Bleeding was not observed.

B: Slight bleeding was observed.

C: Bleeding was significant and not practically acceptable.

(Ozone Resistance)

Solid images of magenta and cyan were respectively printed on each sheet for inkjet recording at a reflection density of 1.0±0.1, using an inkjet printer (trade name: "PM-G820", manufactured by Seiko Epson Corporation), and the printed images were stored for 48 hours in an environment at an ozone concentration of 5 ppm. The magenta and cyan densities before storage and after storage were measured with a reflection densitometer (trade name: "X-RITE 938", manufactured by X-Rite Inc.), and the residual rate of the magenta and cyan densities were calculated.

—Evaluation Criteria—

A: The lower value of the respective residual rates of magenta and cyan was 85% or greater.

B: The lower value of the respective residual rates of magenta and cyan was from 75% to less than 85%.

C: The lower value of the respective residual rates of magenta and cyan was from 65% to less than 75%.

D: The lower value of the respective residual rates of magenta and cyan was less than 65%.

(Density)

A black solid image was printed on each inkjet recording medium in an environment of 23° C. and 50% RH, using an inkjet printer (trade name: A820, manufactured by Seiko Epson Corporation). After the printing, the images were left to stand overnight in the environment of 23° C. and 50% RH, and the visual reflection density was measured with a densitometer (trade name: X-RITE 310TR).

—Evaluation Criteria—

A: The density was 2.4 or greater.

B: The density was 2.3 or greater and less than 2.4.

C: The density was 2.2 or greater and less than 2.3.

D: The density was less than 2.2.

(Water Resistance)

Solid images of yellow, magenta, cyan, black, blue, green and red were printed on each inkjet recording sheet, using an inkjet printer (trade name: A820, manufactured by Seiko Epson Corporation), and the images were left to stand overnight in ambient conditions of 23° C. and 50% RH. Subsequently, water droplets were dropped at end parts of the respective solid color images, and the images were further left to stand overnight and dried. The degree of bleeding of ink was evaluated by visual inspection.

—Evaluation Criteria—

A: Bleeding of the dye was not observed.

B: Bleeding of the dye was observed, but was very slight and not obvious.

C: Bleeding of the dye was clearly observed but was within an acceptable range

D: Bleeding of the dye was clearly and widely observed, and was not acceptable.

(Coating Liquid Stability)

The ink receiving layer-coating liquids A1 to A4 and B1 to B3 were respectively left to stand in ambient conditions of 30° C., and from the time at which the viscosity increased with time to reach 300 mPs or higher, the coating liquids were evaluated according to the following evaluation criteria.

—Evaluation Criteria—

A: Although the coating liquid was left to stand overnight after the preparation of the ink receiving layer-coating liquid, there were no problems in handling.

B: If standing time was within one hour after the preparation of the ink receiving layer-coating liquid, there were no problems in handling.

C: There were no problems in handling immediately after the preparation of the ink receiving layer-coating liquid.

D: The increase in the viscosity was significant, and handling was impossible.

(State of Coated Surface)

For each inkjet recording medium, the degree of occurrence of film cracks and "comet with nucleus" defects occurring on the surface of the ink receiving layer at the time of drying the coating, were evaluated by visual inspection, and ranked according to the following criteria.

—Evaluation Criteria—

A: Film cracks and defects did not occur.

B: Film cracks and defects occurred to a slight but insignificant degree.

C: Occurrence of film cracks and defects could be confirmed.

D: The extent of film cracks and defects was at a problematic level.

(Brittleness)

In ambient conditions of 23° C. and 15% RH, an inkjet recording medium cut to a size of 3 cm×10 cm was left to stand overnight, and then was wound around cylinders of various types with different diameters, such that the outer surface became the image-receiving layer surface. It was evaluated by visual inspection as to whether cracks occurred at the ink receiving layer. The inkjet recording media were further ranked as follows, based on the diameter of the smallest cylinder at which cracks did not occur.

—Evaluation Criteria—

A: Cracks did not occur until the diameter of the cylinder was reduced to 10 mm.

B: Cracks did not occur until the diameter of the cylinder was reduced to 20 mm.

C: Cracks did not occur until the diameter of the cylinder was reduced to 30 mm.

D: Cracks occurred when the cylinder had a diameter larger than 30 mm.

TABLE 1

| | Under coat | Lower layer | | | | | | Upper layer | | | | | |
|---|---|---|---|---|---|---|---|---|---|---|---|---|---|
| | layer *1 | *2 | Type of PVA | *3 | *4 | *1 | *5 | *2 | Type of PVA | *3 | *4 | *6 | *7 |
| Ex. 1 | Present | A1 | *8 | — | — | Absent | — | | | — | | | *10 |
| Ex. 2 | Present | A2 | *8 | HPC-SSL | — | Absent | — | | | — | | | *10 |

TABLE 1-continued

| | | | | | | | | | | | | | |
|---|---|---|---|---|---|---|---|---|---|---|---|---|---|
| Ex. 3 | Present | A3 | *8 | HPC-SSL | *9 | Absent | — | | | — | | | *10 |
| Ex. 4 | Present | A3 | *8 | HPC-SSL | *9 | Absent | — | B1 | PVA-235 | — | *9 | — | *10 |
| Ex. 5 | Present | A3 | *8 | HPC-SSL | *9 | Absent | PVA-235 | B2 | PVA-235 | — | — | *10 | — |
| Ex. 6 | Present | A3 | *8 | HPC-SSL | *9 | Absent | PVA-235 | B3 | PVA-235 | HPC-SSL | *9 | *10 | — |
| Ex. 7 | Present | A1 | *8 | — | — | Absent | PVA-235 | B2 | PVA-235 | — | — | *10 | — |
| Ex. 8 | Present | A3 | *8 | HPC-SSL | *9 | Absent | — | B2 | PVA-235 | — | — | *10 | — |
| Comp. Ex. 1 | Absent | A3 | *8 | HPC-SSL | *9 | Absent | — | B1 | PVA-235 | — | *9 | — | *10 |
| Comp. Ex. 2 | Absen | A4 | *8 | — | *9 | Present | — | | | | | | — |

| | Evaluation | | | | | | |
|---|---|---|---|---|---|---|---|
| | *11 | Ozone resistance | Density | Water resistance | Coaling liquid stability | State of coated surface | Brittleness |
| Ex. 1 | B | A | A | C | A | A | A |
| Ex. 2 | A | A | B | C | A | B | A |
| Ex. 3 | A | A | B | A | B | C | A |
| Ex. 4 | A | A | A | — | A | A | A |
| Ex. 5 | A | A | A | — | A | A | A |
| Ex. 6 | A | A | B | — | B | B | B |
| Ex. 7 | C | A | A | — | A | B | A |
| Ex. 8 | A | A | A | — | A | B | A |
| Comp. Ex. 1 | A | C | A | — | A | A | A |
| Comp. Ex. 2 | C | C | C | — | C | C | B |

*1: Magnetic chloride
*2: Type of coating liquid
*3: Water-soluble cellulose
*4: Water-soluble aluminum compound
*5: Intermediate layer
*6: Water-soluble multifunctional crosslinking agent
*7: Crosslinking solution
*8: Acetoactyl-modified PVA
*9: Polyaluminum chloride
*10: Adipic acid dihydrazide
*11: Moisture resistance (bleeding)

As is shown in the above Table 1, in Examples 1 to 8, there were obtained ink receiving layers having a good state of coated surface and reduced brittleness, while favorably maintaining the stability of the coating liquids used in the coating. After the recording, the ozone resistance was good, and bleeding of the images was reduced.

On the other hand, in Comparative Examples 1 and 2, if magnesium chloride was not present in the undercoat layer, ozone resistance could not be secured. Furthermore, when magnesium chloride was incorporated into the coating film-forming liquid A3 or A4, not only the ozone resistance could not be secured, but also the coating liquid stability or the state of coated surface was deteriorated. Furthermore, the bleeding in the image after recording became deteriorated.

Example 9

Preparation of Ink Receiving Layer-Coating Liquid for A1

The ink receiving layer-coating liquid A1 (first solution) was prepared in the same manner as in Example 1.

(Preparation of Ink Receiving Layer-Coating Liquid B2)

The ink receiving layer-coating liquid for B2 (curing solution) was prepared in the same manner as in Example 5.

—Production of Inkjet Recording Medium—

The front surface of a support having an undercoating layer containing magnesium chloride was subjected to a corona discharge treatment in the same manner as in Example 1, and then multilayer coating was performed with a slide bead coater such that the ink receiving layer-coating liquid A1 was coated in a coating amount of 160 cc/$m^2$ as a lower layer, and the ink receiving layer-coating liquid B2 was coated in a coating amount of 40 cc/$m^2$ as an upper layer, to form a first coating film formed from the ink receiving layer-coating liquid A1 and a second coating film formed from the ink receiving layer-coating liquid B2 in this sequence from the support side. The coating films were dried by a hot air dryer at 80° C. (air speed 3 m/sec) for 10 minutes. Thereby, an inkjet recording medium was produced.

Example 10

An inkjet recording medium was produced in the same manner as in Example 9, except that the ink receiving layer-coating liquid A1 was replaced by the ink receiving layer-coating liquid A2.

Example 11

An inkjet recording medium was produced in the same manner as in Example 9, except that the ink receiving layer-coating liquid A1 was replaced by the ink receiving layer-coating liquid A3.

Example 12

Preparation of Ink Receiving Layer-Coating Liquid A1

The ink receiving layer-coating liquid A1 (first solution) was prepared in the same manner as in Example 1.

(Preparation of Ink Receiving Layer-Coating Liquid B4)

An ink receiving layer-coating liquid B4 (second solution) was prepared in the same manner as in the case of the ink receiving layer-coating liquid A1, except that the composition of the ink receiving layer-coating liquid A1 was changed as follows.

—Composition of Ink Receiving Layer-Coating Liquid B4—

| | | |
|---|---|---|
| (1) | Gas phase process silica fine particles (inorganic fine particles) (trade name: AEROSIL 300SV, manufactured by Nippon Aerosil Co., Ltd.) | 10.0 parts |
| (2) | Ion-exchanged water | 57 parts |
| (3) | "SHALLOL DC-902P" (51.5% aqueous solution) (dispersant, manufactured by Dai-ichi Kogyo Seiyaku Co., Ltd.) | 0.78 parts |
| (4) | Boric acid (crosslinking agent) | 0.37 parts |
| (5) | 7% aqueous solution of polyvinyl alcohol (trade name: PVA-235, manufactured by Kuraray Co., Ltd.) | 29 parts |
| (6) | 10% aqueous soluion of surfactant (trade name: EMULGEN 109P, manufactured by Kao Corporation) | 0.6 parts |

(Preparation of Crosslinking Agent Solution 1)

The crosslinking agent solution 1 was prepared in the same manner as in Example 1.

—Production of Inkjet Recording Medium—

The front surface of a support having an undercoating layer containing magnesium chloride was subjected to a corona discharge treatment in the same manner as in Example 1, and then multilayer coating was performed with a slide bead coater such that the ink receiving layer-coating liquid A1 was coated in a coating amount of 160 cc/$m^2$ as a lower layer, and the ink receiving layer-coating liquid B4 was coated in a coating amount of 40 cc/$m^2$ as an upper layer, to form a first coating film formed from the ink receiving layer-coating liquid A1 and a second coating film formed from the ink receiving layer-coating liquid B4 in this sequence from the support side. The coating films were dried by a hot air dryer at 80° C. (air speed 3 m/sec) for 3 minutes. During this period, the coating film exhibited constant-rate drying. Immediately after the drying for 3 minutes, this coating film was immersed in the crosslinking agent solution 1 for 1 second, and was dried at 80° C. for 10 minutes. Thereby, an inkjet recording medium was produced.

Example 13

An inkjet recording medium was produced in the same manner as in Example 12, except that the ink receiving layer-coating liquid A1 was replaced by the ink receiving layer-coating liquid A2.

Example 14

An inkjet recording medium was produced in the same manner as in Example 12, except that the ink receiving layer-coating liquid A1 was replaced by a ink receiving layer-coating liquid A5 having the following composition.

—Composition of Ink Receiving Layer-Coating Liquid A5—

| | | |
|---|---|---|
| (1) | Gas phase process silica fine particles (inorganic fine particles) (trade name: AEROSIL 300SV, manufactured by Nippon Aerosil Co., Ltd.) | 10.0 parts |
| (2) | Ion-exchanged water | 59 parts |
| (3) | "SHALLOL DC-902P" (51.5% aqueous solution) (dispersant, manufactured by Dai-ichi Kogyo Seiyaku Co., Ltd.) | 0.78 parts |
| (4) | Boric acid (crosslinking agent) | 0.37 parts |
| (5) | 7% aqueous solution of acetoacetyl-modified polyvinyl alcohol (trade name: Z210, manufactured by Nippon Synthetic Chemical Industry Co., Ltd.) | 29 parts |
| (6) | Polyaluminum chloride (trade name: ALFINE 83, manufactured by Taimei Chemicals Co., Ltd.) | 1.5 parts |
| (7) | 10% aqueous solution of surfactant (trade name: EMULGEN 109P, manufactured by Kao Corporation) | 0.6 parts |

Example 15

An inkjet recording medium was produced in the same manner as in Example 12, except that the ink receiving layer-coating liquid A1 was replaced with the ink receiving layer-coating liquid A3.

Example 16

Preparation of Ink Receiving Layer-Coating Liquid A1

The ink receiving layer-coating liquid A1 (first solution) was prepared in the same manner as in Example 1.

(Preparation of Ink Receiving Layer-Coating Liquid B4)

The ink receiving layer-coating liquid B4 (second solution) was prepared in the same manner as in Example 12.

(Preparation for Ink Receiving Layer-Coating Liquid B2)

The ink receiving layer-coating liquid B2 (curing solution) was prepared in the same manner as in Example 9.

(Production of Inkjet Recording Medium)

The front surface of a support having an undercoat layer containing magnesium chloride was subjected to a corona discharge treatment in the same manner as in Example 1, and then simultaneous multilayer coating of three liquids was performed with a slide bead coater such that the ink receiving layer-coating liquid A1 was coated in a coating amount of 140 cc/$m^2$ as a lowermost layer, the ink receiving layer-coating liquid B4 was coated in a coating amount of 20 cc/$m^2$ as an intermediate layer, and the ink receiving layer-coating liquid B2 was coated in a coating amount of 40 cc/$m^2$ as an uppermost layer, to form a first coating film formed from the ink receiving layer-coating liquid A1, a second coating film formed from the ink receiving layer-coating liquid B4 and a third coating film formed from the ink receiving layer-coating liquid B2 in this sequence from the support side. The coating films were dried by a hot air dryer at 80° C. (air speed 3 m/sec) for 10 minutes. Thereby, an inkjet recording medium was produced.

Example 17

An inkjet recording medium was produced in the same manner as in Example 16, except that the ink receiving layer-coating liquid A1 according to Example 16 was replaced by the ink receiving layer-coating liquid A2.

Example 18

An inkjet recording medium was produced in the same manner as in Example 16, except that the ink receiving layer-coating liquid A1 was replaced by the ink receiving layer-coating liquid A3.

Comparative Example 3

Production of Inkjet Recording Medium

The front surface of the support obtained in Comparative Example 1 was subjected to a corona discharge treatment, and then the undercoat layer-forming liquid B of Comparative Example 1 was coated in a coating amount of 10 ml/$m^2$ by using a wire bar, and was dried at 70° C. for 2 minutes, to form an undercoat layer.

An inkjet recording medium was produced in the same manner as in Example 3, except that the aforementioned support was used as the support having an undercoat layer.

Comparative Example 4

An inkjet recording medium was produced in the same manner as in Comparative Example 3, except that the ink receiving layer-coating liquid A3 was changed to the ink receiving layer-coating liquid A4.

Comparative Example 5

The inkjet recording medium of Comparative Example 5 was produced in the same manner as in Example 1, except that sodium chloride was used instead of magnesium chloride in the composition of the undercoating layer-forming liquid.

Comparative Example 6

The inkjet recording medium of Comparative Example 6 was produced in the same manner as in Example 1, except that chrome alum was used instead of magnesium chloride in the composition of the undercoating layer-forming liquid <Evaluation>

The respective inkjet recording media obtained in the Examples 9 to 18 and Comparative Examples 3 to 6 described above were subjected to the aforementioned evaluations and measurements. The results of the measurements and evaluations are presented in the following Table 2.

TABLE 2

| | | Lower layer | | | | | | Upper layer | | | | | |
|---|---|---|---|---|---|---|---|---|---|---|---|---|---|
| | Undercoat layer | *2 | Type of PVA | *3 | *4 | *1 | *5 | *2 | Type of PVA | *3 | *4 | *6 | *7 |
| Ex. 9 | *1 | A1 | *8 | — | — | Absent | — | B2 | PVA-235 | — | — | *10 | — |
| Ex. 10 | *1 | A2 | *8 | HPC-SSL | — | Absent | — | B2 | PVA-235 | — | — | *10 | — |
| Ex. 11 | *1 | A3 | *8 | HPC-SSL | *9 | Absent | — | B2 | PVA-235 | — | — | *10 | — |
| Ex. 12 | *1 | A1 | *8 | — | — | Absent | — | B4 | PVA-235 | — | — | — | *10 |
| Ex. 13 | *1 | A2 | *8 | HPC-SSL | — | Absent | — | B4 | PVA-235 | — | — | — | *10 |
| Ex. 14 | *1 | A5 | *8 | — | *9 | Absent | — | B4 | PVA-235 | — | — | — | *10 |
| Ex. 15 | *1 | A3 | *8 | HPC-SSL | *9 | Absent | — | B4 | PVA-235 | — | — | — | *10 |
| Ex. 16 | *1 | A1 | *8 | — | — | Absent | PVA-235 | B2 | PVA-235 | — | — | *10 | — |
| Ex. 17 | *1 | A2 | *8 | HPC-SSL | — | Absent | PVA-235 | B2 | PVA-235 | — | — | *10 | — |
| Ex. 18 | *1 | A3 | *8 | HPC-SSL | *9 | Absent | PVA-235 | B2 | PVA-235 | — | — | *10 | — |
| Comp. Ex. 3 | Absent | A3 | *8 | HPC-SSL | *9 | Absent | — | | | — | | | *10 |
| Comp. Ex. 4 | Absent | A4 | *8 | HPC-SSL | *9 | Present | — | | | — | | | *10 |
| Comp. Ex. 5 | *12 | A1 | *8 | — | — | Absent | — | | | — | | | *10 |
| Comp. Ex. 6 | *13 | A1 | *8 | — | — | Absent | — | | | — | | | *10 |

| | Evaluation | | | | | | |
|---|---|---|---|---|---|---|---|
| | *11 | Ozone resistance | Density | Water resistance | Coating liquid stability | State of coated surface | Brittleness |
| Ex. 9 | B | A | A | C | A | B | B |
| Ex. 10 | A | A | A | C | A | B | A |
| Ex. 11 | A | A | A | A | A | B | A |
| Ex. 12 | B | A | A | C | A | A | A |
| Ex. 13 | A | A | A | C | C | A | A |
| Ex. 14 | B | A | A | A | A | A | A |
| Ex. 15 | A | A | A | C | A | A | A |
| Ex. 16 | B | A | A | C | A | A | A |

TABLE 2-continued

| | | | | | | | |
|---|---|---|---|---|---|---|---|
| Ex. 17 | A | A | A | C | A | A | A |
| Ex. 18 | A | A | A | A | A | A | A |
| Comp. Ex. 3 | A | C | B | A | A | C | B |
| Comp. Ex. 4 | A | C | C | A | C | D | C |
| Comp. Ex. 5 | C | B | A | D | A | A | A |
| Comp. Ex. 6 | B | C | A | C | A | A | A |

*1 to *11 each have the same meanings as in Table 1.

*12: Sodium chloride

*13: Chrome alum

As is shown in the above Table 2, in Examples 9 to 18, there were obtained ink receiving layers having a good state of coated surface and reduced brittleness, while favorably maintaining the stability of the coating liquid used in the coating. After the recording, the ozone resistance was good, and the bleeding of the images was suppressed.

On the other hand, in Comparative Examples 3 to 4 wherein magnesium chloride was not present in the undercoat layer, ozone resistance and the state of the coated surface could not be secured. Furthermore, in Comparative Examples 5 to 6 wherein sodium chloride or chrome alum was incorporated instead of magnesium chloride into the undercoat layer-forming liquid, water resistance was deteriorated, and either moisture resistance or ozone resistance became deteriorated.

What is claimed is:

1. A method for manufacturing an inkjet recording medium, the method comprising:

forming an undercoat layer by coating an undercoat layer-forming liquid, containing a binder resin and a water-soluble divalent metal salt, on a support;

forming a coating film by coating a coating film-forming liquid, containing at least inorganic fine particles and an acetoacetyl-modified polyvinyl alcohol, on the undercoat layer; and applying a curing solution containing a water-soluble multifunctional compound, having two or more amino groups in the molecule, onto the coating film, either simultaneously within the forming of the coating film, or before the coating film undergoes decreasing-rate drying during drying of the coating film.

2. The method for manufacturing an inkjet recording medium of claim 1, wherein the curing solution further comprises inorganic fine particles and polyvinyl alcohol excluding acetoacetyl-modified polyvinyl alcohol.

3. The method for manufacturing an inkjet recording medium of claim 1, wherein the coating film-forming liquid comprises a first solution containing at least inorganic fine particles and an acetoacetyl-modified polyvinyl alcohol and a second solution containing at least inorganic fine particles and polyvinyl alcohol excluding acetoacetyl-modified polyvinyl alcohol, and the forming of the coating film is carried out by performing simultaneous multilayer coating of the first solution and the second solution, such that the second solution is disposed above the first solution, to form layers of coating films.

4. The method for manufacturing an inkjet recording medium of claim 1, wherein the coating film-forming liquid contains a water-soluble cellulose derivative and, when the coating film-forming liquid comprises a first solution and a second solution, at least one of the first solution and the second solution contains a water-soluble cellulose derivative.

5. The method for manufacturing an inkjet recording medium of claim 1, wherein the coating film-forming liquid contains a water-soluble aluminum compound.

6. The method for manufacturing an inkjet recording medium of claim 1, wherein the coating film-forming liquid comprises a first solution containing at least inorganic fine particles and an acetoacetyl-modified polyvinyl alcohol and a second solution containing at least inorganic fine particles and polyvinyl alcohol excluding acetoacetyl-modified polyvinyl alcohol, the forming of the coating film comprises forming layers of coating films by performing simultaneous multilayer coating such that the second solution is disposed above the first solution, the curing solution further contains inorganic fine particles and polyvinyl alcohol excluding acetoacetyl-modified polyvinyl alcohol, and simultaneous multilayer coating of the first solution, the second solution and the curing solution is performed on the undercoat layer formed on the support, such that a positional relationship is obtained among the first solution, the second solution and the curing solution in this sequence from the undercoat layer side, thereby forming layers of coating films on the undercoat layer.

* * * * *